United States Patent
Kataoka et al.

(10) Patent No.: US 10,143,324 B2
(45) Date of Patent: Dec. 4, 2018

(54) HEATING COOKER PROVIDED WITH COOKING CONTAINER

(71) Applicant: Panasonic Intellectual Property Management Co., Ltd., Osaka (JP)

(72) Inventors: Akira Kataoka, Shiga (JP); Masaki Shibuya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 344 days.

(21) Appl. No.: 15/122,428

(22) PCT Filed: Apr. 2, 2015

(86) PCT No.: PCT/JP2015/001887
§ 371 (c)(1),
(2) Date: Aug. 30, 2016

(87) PCT Pub. No.: WO2015/155960
PCT Pub. Date: Oct. 15, 2015

(65) Prior Publication Data
US 2017/0095104 A1    Apr. 6, 2017

(30) Foreign Application Priority Data

Apr. 9, 2014  (JP) .................................. 2014-079855

(51) Int. Cl.
*H05B 6/64* (2006.01)
*A47J 27/00* (2006.01)
(Continued)

(52) U.S. Cl.
CPC ............. *A47J 27/002* (2013.01); *A47J 27/00* (2013.01); *A47J 36/06* (2013.01); *F24C 11/00* (2013.01);
(Continued)

(58) Field of Classification Search
CPC ........................... H05B 6/6479; H05B 6/6473
(Continued)

(56) References Cited

U.S. PATENT DOCUMENTS 3,753,651 A * 8/1973 Boucher .................... A61L 2/12
                                                      219/738
4,728,762 A * 3/1988 Roth ...................... A47J 36/027
                                                      219/681
(Continued)

FOREIGN PATENT DOCUMENTS

JP    9-101034      4/1997
JP    2009-035276   2/2009

OTHER PUBLICATIONS

International Search Report of PCT application No. PCT/JP2015/001887 dated Jun. 30, 2015.

*Primary Examiner* — Reginald L Alexander
(74) *Attorney, Agent, or Firm* — Brinks Gilson & Lione

(57) ABSTRACT

The heating cooker includes microwave generation devices that transfer microwaves to a cooking chamber, and a steam generation device that generates steam. The generated steam is guided to a first container, and a second container is provided on the first container. Then, a first foodstuff in the first container is heated by microwaves, and is also directly heated by the steam. A second foodstuff in the second container is heated by the microwaves, and is also indirectly heated by the steam. Accordingly, the heating cooker provided with cooking container capable of quickly heating a plurality of foodstuffs while improving the taste can be realized by using the heat of the microwaves and the steam.

11 Claims, 8 Drawing Sheets

(51) Int. Cl.
*F24C 11/00* (2006.01)
*A47J 36/06* (2006.01)
A47J 27/04 (2006.01)
F24C 15/32 (2006.01)

(52) U.S. Cl.
CPC ......... *H05B 6/6473* (2013.01); *H05B 6/6479* (2013.01); *A47J 2027/043* (2013.01); *F24C 15/327* (2013.01)

(58) Field of Classification Search
USPC ................. 99/357, 410, 473, 474, 476, 484; 219/681, 682
See application file for complete search history.

(56) References Cited

U.S. PATENT DOCUMENTS

| | | | | |
|---|---|---|---|---|
| 6,040,564 | A * | 3/2000 | Ueda | H05B 6/6479 |
| | | | | 219/401 |
| 6,730,895 | B2 * | 5/2004 | Kim | H05B 6/6479 |
| | | | | 219/682 |
| 7,836,874 | B2 * | 11/2010 | McFadden | A21B 1/245 |
| | | | | 126/21 A |
| 2005/0173421 | A1 * | 8/2005 | Kim | H05B 6/6494 |
| | | | | 219/682 |
| 2006/0191915 | A1 * | 8/2006 | Kanzaki | F24C 15/003 |
| | | | | 219/682 |
| 2013/0156906 | A1 * | 6/2013 | Raghavan | A47J 37/0641 |
| | | | | 426/243 |

\* cited by examiner

HEATING COOKER PROVIDED WITH COOKING CONTAINER

THIS APPLICATION IS A U.S. NATIONAL PHASE APPLICATION OF PCT INTERNATIONAL APPLICATION PCT/JP2015/001887.

TECHNICAL FIELD

The present invention relates to a heating cooker provided with cooking container that heats a plurality of foodstuffs, using microwaves and steam.

BACKGROUND ART

Conventionally, there has been proposed a cooking container that heats a plurality of foodstuffs, using microwaves of a microwave oven, in accordance with each foodstuff (for example, refer to Patent Literature 1 (PTL 1). As a specific heating method, the cooking container is divided into a plurality of chambers. By providing a pressure adjusting mechanism in an upper lid of each chamber, the chambers are heated by the microwaves. Accordingly, the heating can be performed in accordance with respective foodstuffs.

However, according to the conventional heating cooker that heats the plurality of foodstuffs, a pressure adjusting mechanism needs to be provided on the upper lid of each heated chamber. Therefore, the heating cooker has a problem in that the configuration becomes complex.

CITATION LIST

Patent Literature

PTL 1: Unexamined Japanese Patent Publication No. 2009-35276

SUMMARY OF THE INVENTION

The present invention provides a heating cooker provided with cooking container capable of quickly heating a plurality of foodstuffs by accommodating a plurality of foodstuffs in cooking containers of simple configurations, and by using microwaves and steam.

That is, the heating cooker provided with cooking container according to the present invention includes a cooking chamber provided inside a body of the heating cooker and having a door openably provided in a front opening part, a microwave generation device that transfer microwaves to the cooking chamber via a wave guide, a steam generation device installed in the body, and a cooking-container mounting part provided in the cooking chamber. The heating cooker further includes a steam discharge portion having a first end installed in the steam generation device and having a second end inserted into the cooking-container mounting part, a first cooking container accommodated in the cooking-container mounting part and accommodating a first foodstuff, and a first container lid covering an upper part of the first cooking container. The heating cooker further includes a second cooking container provided close to the first cooking container, partitioned from the first cooking container and accommodating a second foodstuff, and an opening hole provided on a wall surface of the first cooking container and communicating between a space in the first cooking container and a space in the cooking-container mounting part. The microwave generation device radiates the first cooking container and the second cooking container with the microwaves. The steam generation device introduces steam into the first cooking container via the opening hole. Then, the steam directly heats the first foodstuff accommodated in the first cooking container, and indirectly heats the second foodstuff accommodated in the second cooking container.

According to this configuration, the first cooking container is installed in the cooking-container mounting part, and the steam generated by the steam generation device is introduced into the first cooking container. Accordingly, the first foodstuff in the first cooking container is heated by the steam. At this time, in the first cooking container, the foodstuff (boiled rice, steamed meat buns, or noodles, for example) whose taste or the like is improved by heating by the steam is placed. As a result, the foodstuff can be finished in good taste. At the same time, because the first foodstuff is heated by the microwaves, the heating time can be shortened.

Further, the second cooking container is provided close to the first cooking container. Then, the heat used to warm up the first foodstuff in the first cooking container is transferred to the second foodstuff in the second cooking container. Accordingly, the second foodstuff is heated by the indirectly transferred heat of the steam, not by the direct heat of the steam. Therefore, the foodstuff (grilled food, fried food, or sauces, for example) whose taste deteriorates when directly applied with the steam is accommodated as the second foodstuff in the second cooking container. Accordingly, by preventing the steam from directly entering the second cooking container, the taste of the second foodstuff in the second cooking container is prevented from being reduced due to the steam.

At the same time with the heat transfer, the second foodstuff is heated by the microwaves in a similar manner to that of the heating of the first foodstuff. Therefore, the heating time can be shortened.

That is, by accommodating a plurality of foodstuffs in the cooking containers in simple configurations, the foodstuffs can be cooked using steam and microwaves. As a result, the heating cooker provided with cooking container capable of improving the taste of each foodstuff and quickly cooking the foodstuff can be realized.

DESCRIPTION OF EMBODIMENTS

Exemplary embodiments of the present invention will be described below with reference to the drawings. The present invention is not limited by the exemplary embodiments.

First Exemplary Embodiment

Hereinafter, a configuration of a heating cooker provided with cooking container according to a first exemplary embodiment of the present invention will be described with reference to FIG. 1 and FIG. 2.

Figure 1:
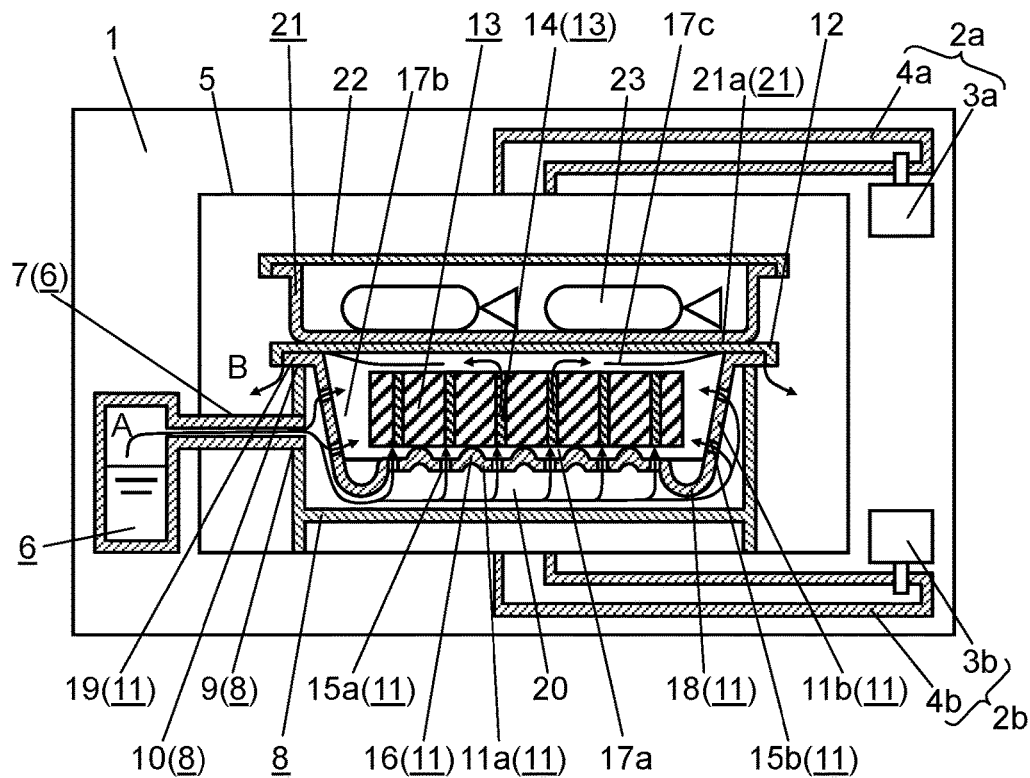
FIG. 1 is a sectional view illustrating a heating cooker provided with cooking container according to a first exemplary embodiment of the present invention.
Figure 2:
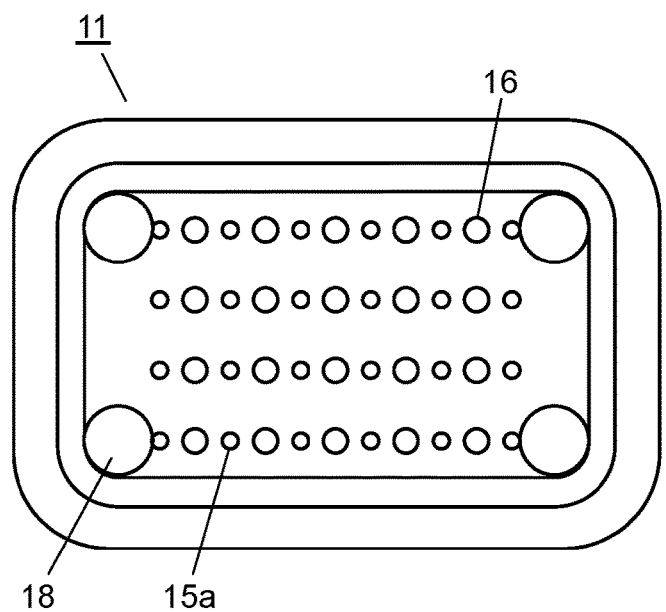
FIG. 2 is a back-side plan view of a first cooking container according to the first exemplary embodiment.

FIG. 1 is a sectional view illustrating the heating cooker provided with cooking container according to the first exemplary embodiment of the present invention. FIG. 2 is a back-side plan view of a first cooking container according to the first exemplary embodiment.

As illustrated in FIG. 1, the heating cooker provided with cooking container according to the present exemplary embodiment is configured by, for example, at least body 1 having cooking chamber 5, cooking-container mounting part 8, first container lid 12, first cooking container 11 for accommodating first foodstuff 13, second container lid 22, second cooking container 21 for accommodating second foodstuff 23, steam generation device 6, and microwave generation devices 2a, 2b.

In the following description, in each drawing, a door-provided side of body 1 will be assumed as front, a right side looked at from the front will be assumed as right, and a left side of body 1 looked at from the front will be assumed as left. This will be similarly applied to each exemplary embodiment described later.

Cooking chamber 5 in body 1 includes an openable door (not illustrated) in a front opening part. By opening and closing the door, first cooking container 11 (hereinafter, referred to as a "first container") and second cooking container 21 (hereinafter, referred to as a "second container") are accommodated in cooking chamber 5 so as to be freely taken in and out.

Further, in cooking chamber 5, microwave generation device 2a is installed at an upper part, and microwave generation device 2b is installed at a lower part, via wave guides 4a, 4b, respectively.

Magnetron 3a that generates microwaves is provided inside microwave generation device 2a. The microwaves generated by magnetron 3a are transferred through wave guide 4a, and are guided to an upper microwave-feed opening (not illustrated) formed on an upper surface of cooking chamber 5. The microwaves guided to the upper microwave-feed opening are transmitted through an upper feed-opening cover made of a dielectric (not illustrated) that is installed to close the upper microwave-feed opening. Then, the microwaves are radiated from above of cooking chamber 5 toward second container 21, and heat second foodstuff 23.

Similarly, magnetron 3b that generates microwaves is included inside microwave generation device 2b. The microwaves generated by magnetron 3b are transferred through wave guide 4b, and are guided to a lower microwave-feed opening (not illustrated) formed on a lower surface of cooking chamber 5. The microwaves guided to the lower microwave-feed opening are transmitted through a lower feed-opening cover made of a dielectric (not illustrated) that is installed to close the lower microwave-feed opening. Then, the microwaves are radiated from below of cooking chamber 5 toward first container 11, and heat first foodstuff 13.

Steam generation device 6 is provided in body 1 at, for example, an outside of a left side surface of cooking chamber 5, and generates steam by heating water by a heater or the like (not illustrated). Steam generation device 6 includes steam discharge portion 7 in a projection shape. A first end of steam discharge portion 7 is installed in steam generation device 6, and a second end is inserted into cooking chamber 5.

Cooking-container mounting part 8 (hereinafter, described as a "container mounting part") is formed of a polypropylene resin, for example, and is placed on a bottom surface in cooking chamber 5. Container mounting part 8 has a space inside, and accommodates first container 11 and the like in the space.

Further, container mounting part 8 includes steam inlet 9 into which an end part of steam discharge portion 7 of steam generation device 6 is inserted. Accordingly, steam generated by steam generation device 6 is introduced into container mounting part 8. Further, container mounting part 8 accommodates first container 11 via steam outlet 10 provided to open upward at an upper part.

A configuration of first container 11 will be described in detail below.

First, first container 11 is formed of a polypropylene resin, for example, and accommodates first foodstuff 13 inside. Accommodated first foodstuff 13 is frozen boiled-rice, for example.

First foodstuff 13 is provided in advance with a plurality of communication holes 14 inside first foodstuff 13, is formed in a substantially rectangular parallelepiped shape (including a rectangular parallelepiped shape), and is further solidified by freezing. Examples of first foodstuff 13 include frozen boiled-rice with red beans, and frozen pilaf, similar to the frozen boiled-rice.

First container 11 includes opening holes 15a formed on bottom wall 11a, and opening holes 15b formed on side wall 11b. Accordingly, an inner space and an outer space of first container 11 (a space in container mounting part 8) are communicated with each other via opening holes 15a, 15b. Holding portion 16 composed of, for example, spherical projections having a convex surface above is formed on bottom wall 11a of first container 11. Holding portion 16 holds first foodstuff 13 near a vertex of holding portion 16. At this time, space 17a is formed between first foodstuff 13 and bottom wall 11a of first container 11. Similarly, space 17b is formed between first foodstuff 13 and side wall 11b of first container 11, and space 17c is formed between first foodstuff 13 and first container lid 12.

Further, first container 11 includes foot portions 18 composed of spherical projections, for example, and having a convex surface below, at four positions on bottom wall 11a (refer to FIG. 2).

First container 11 is configured as described above.

First container 11 in the above configuration is placed from steam outlet 10 into container mounting part 8. Then, first container 11 is locked onto steam outlet 10 by flange portion 19 formed at an upper end. Accordingly, first container 11 is accommodated in container mounting part 8, and is installed. At this time, steam reservoir space 20 constituting a closed space is formed between container mounting part 8 and first container 11.

Then, first container lid 12 is provided to cover an upper part of first container 11, and is formed of a polypropylene resin, for example.

Second container 21 is formed of a polypropylene resin, for example, and accommodates second foodstuff 23 inside. Accommodated second foodstuff 23 includes a fried food, for example.

Second container lid 22 is provided to cover an upper part of second container 21, and is formed of a polypropylene resin, for example.

At this time, second container 21 is disposed by having bottom surface 21a brought into surface contact with an upper surface of first container lid 12.

The heating cooker provided with cooking container according to the present exemplary embodiment is configured as described above.

Hereinafter, operation and action of the heating cooker provided with cooking container according to the present exemplary embodiment will be described with reference to FIG. 1.

First, as illustrated in FIG. 1, in cooking chamber 5 of body 1, container mounting part 8 is placed, by inserting steam discharge portion 7 of steam generation device 6 into steam inlet 9 of container mounting part 8.

Next, first foodstuff 13 is accommodated in first container 11, and first container lid 12 is applied to an upper part of first container 11. At this time, flange portion 19 at an upper end of first container 11 is locked into an opening end of steam outlet 10 of container mounting part 8.

Next, second foodstuff 23 is accommodated in second container 21, and second container lid 22 is applied to an upper part of second container 21. Then, bottom surface 21a of second container 21 is disposed in surface contact, on an upper surface of first container lid 12.

Container mounting part 8 may be placed in cooking chamber 5, after first container 11 and second container 21 are placed on container mounting part 8.

Next, the door of body 1 of the heating cooker is closed.

Then, a predetermined condition is input, and the heating cooker is driven, via an operation unit (not illustrated) of body 1 of the heating cooker. Accordingly, microwave generation devices 2a, 2b and steam generation device 6 are driven.

When steam generation device 6 is driven, steam is fully supplied from steam discharge portion 7 into container mounting part 8. The supplied steam is supplied from opening holes 15a, 15b formed on first container 11 to spaces 17a, 17b, 17c in first container 11, via steam reservoir space 20 in container mounting part 8, as indicated by arrow A in FIG. 1. The steam reaches first foodstuff 13 accommodated in first container 11. The steam filled in container mounting part 8 is supplied to first foodstuff 13 from the surrounding of first foodstuff 13 and the surfaces of communication holes 14. As a result, first foodstuff 13 is directly heated by the supplied steam. At this time, first foodstuff 13 in the present exemplary embodiment is frozen boiled-rice, for example. Therefore, the frozen boiled-rice can be finished into plump boiled rice by the action of the steam. Accordingly, the taste of the boiled rice is improved.

At the same time, first foodstuff 13 is heated by the microwaves via microwave generation devices 2a, 2b. As a result, by the heating using both the steam and the microwaves, a heating time of first foodstuff 13 can be shortened.

Particularly, heating the foodstuff in the frozen state by using both the steam and the microwaves is optimum as performed by the heating cooker according to the present exemplary embodiment, for the following reasons.

A first reason is that although water can be easily heated, ice cannot be easily heated by the microwave heating, and a difference between required heating characteristics is about 2000 times. Specifically, the steam applied to the surface of the frozen boiled-rice is condensed, and adheres to the surface of the frozen boiled-rice as moisture. The microwaves act on the adhered moisture, and promote the heating. As a result, the heating time of the foodstuff can be shortened.

A second reason is that first container 11 accommodates frozen first foodstuff 13. Therefore, depending on a freezing process, moisture coming out from a foodstuff and the like is frozen and becomes ice, and the ice may block opening holes 15a, 15b of first container 11. However, when the ice is heated by the steam, the steam is condensed and becomes moisture on the ice that blocks opening holes 15a, 15b. Then, in a similar manner to that described above, the microwaves act on the moisture, and quickly dissolve the ice that blocks the opening holes. Accordingly, the steam can be introduced into first container 11, by immediately setting opening holes 15a, 15b blocked by the ice into a communication state.

A third reason is that even when opening holes 15a, 15b are blocked by ice and the steam does not flow in first container 11, for example, first foodstuff 13 can be heated by the microwaves. Therefore, first foodstuff 13 can be heated stably and quickly.

For the above reasons, the heating cooker according to the present exemplary embodiment heats first foodstuff 13 by using both the steam and the microwaves.

Next, the steam having heated first foodstuff 13 flows as indicated by arrow B in FIG. 1, and warms up first container lid 12. The steam is discharged into cooking chamber 5 through a clearance between flange portion 19 of first container 11 and first container lid 12. At this time, second container 21 is disposed in surface contact, on warmed-up first container lid 12. Therefore, the heat of the steam having warmed up first foodstuff 13 in first container 11 is transferred to second foodstuff 23, via first container lid 12 and second container 21. Accordingly, second foodstuff 23 is indirectly cooked by the heat of the steam.

Further, in a similar manner to that applied to first foodstuff 13, the microwaves also act on and heat second foodstuff 23. Therefore, the heating time of second foodstuff 23 can be also shortened. At this time, when second foodstuff 23 is, for example, a fried food, direct application of the steam to the fried food reduces the crispy taste. However, although the heating cooker in the present exemplary embodiment utilizes the heat of the steam transferred to second container 21 as described above, the steam is not directly applied to second foodstuff 23. Therefore, the taste of second foodstuff 23 is not degraded by the contact with the steam.

That is, the heating cooker provided with cooking container according to the present exemplary embodiment can perform cooking in a short time, without reducing the taste of the foodstuff.

In the present exemplary embodiment, explanations are made, taking a combination example where frozen boiled-rice is used as first foodstuff 13 and fried food is used as second foodstuff 23. However, the combination is not limited to this example. For example, various combinations of first foodstuff 13 and second foodstuff 23 are possible.

Hereinafter, various combinations of first foodstuff 13 and second foodstuff 23 will be described in detail with reference to FIG. 3 and FIG. 4.

Figure 3:
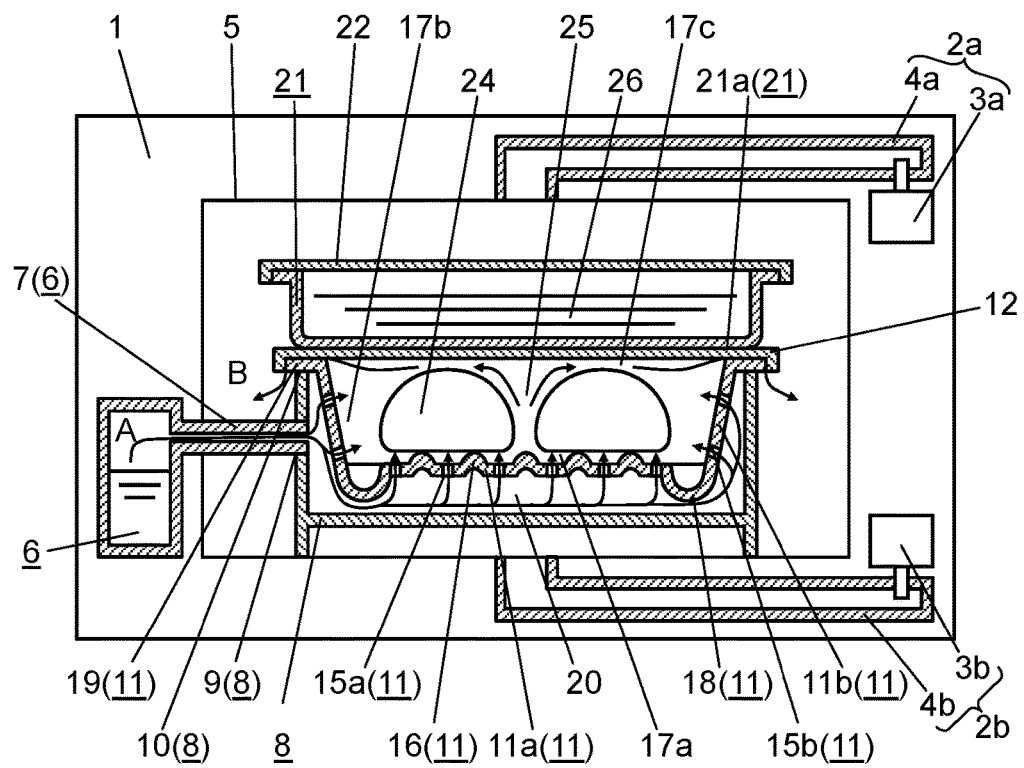
FIG. 3 is a sectional view illustrating an example of a case where frozen steamed-meat buns are placed in the first cooking container and soup is placed in a second cooking container according to the first exemplary embodiment.

FIG. 3 is a sectional view illustrating an example of a case where frozen steamed-meat buns are placed in the first cooking container and soup is placed in a second cooking container according to the first exemplary embodiment. FIG. 4 is a sectional view illustrating an example of a case where frozen noodles are placed in the first cooking container and sauces are placed in the second cooking container according to the first exemplary embodiment.

First, as illustrated in FIG. 3, frozen steamed-meat buns having space 25 are accommodated as first foodstuff 24, and soup is accommodated as second foodstuff 26, in respective cooking containers.

In this case, the steam directly acts on first foodstuff 24 (frozen steamed-meat buns). Because the steamed meat buns and the like are finished plump by the steam, the taste is improved. On the other hand, not directly but indirectly the steam acts on second foodstuff 26 (soup). Therefore, the soup is not thinned by the condensation of the steam. As a result, the taste of the soup as second foodstuff 26 does not deteriorate. Examples of the foodstuffs similar to first foodstuff 24 (frozen steamed-meat buns) include frozen xiaolongbao (soup dumplings) and frozen shumai, and a similar effect can be obtained.

Figure 4:
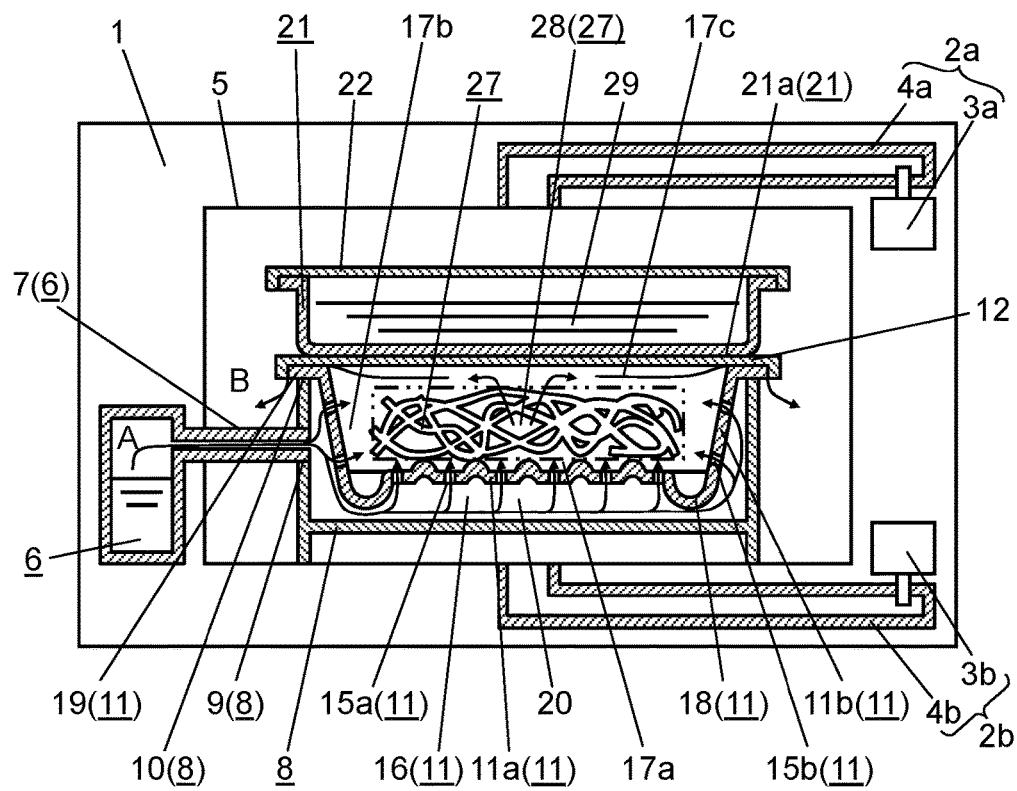
FIG. 4 is a sectional view illustrating an example of a case where frozen noodles are placed in the first cooking container and sauces are placed in the second cooking container according to the first exemplary embodiment.

Further, as illustrated in FIG. 4, frozen noodles having space 28 are accommodated as first foodstuff 27, and a sauce is accommodated as second foodstuff 29, in respective cooking containers.

In this case, the steam directly acts on first foodstuff 27 (frozen noodles). Because suitable moisture is added to the noodles by the steam, the taste is improved. On the other hand, not directly but indirectly the steam acts on second foodstuff 29 (sauce). Therefore, the soup is not thinned by the condensation of the steam. As a result, the taste of the sauce as second foodstuff 29 does not deteriorate. Examples of the foodstuffs similar to first foodstuff 27 (frozen noodles) include frozen wheat noodles, frozen buckwheat noodles, frozen ramen noodles, and frozen pasta, and a similar effect can be obtained.

In the present exemplary embodiment, explanations are made, taking a configuration example where container mounting part 8 is disposed inside cooking chamber 5. However, the configuration is not limited to this example. Because container mounting part 8 is detachably configured, cooking may be performed by removing container mounting part 8. Specifically, by removing container mounting part 8, the microwave heating may be performed using a wide area of cooking chamber 5. Further, cooking chamber 5 may be used to heat a steamed food, by having a whole of cooking chamber 5 filled with the steam. Accordingly, versatility can be enhanced.

In the present exemplary embodiment, explanations are made, taking a configuration example where first container 11 is directly accommodated in container mounting part 8. However, the configuration is not limited to this example. Usually, when first foodstuff 13 is heated by steam, condensed hot moisture is pooled in first container 11, and is discharged from opening holes 15a and the like. Therefore, the surrounding becomes wet and stained by the discharged hot moisture and the like. Depending on the case, a user may get burnt by the hot moisture.

Figure 5:
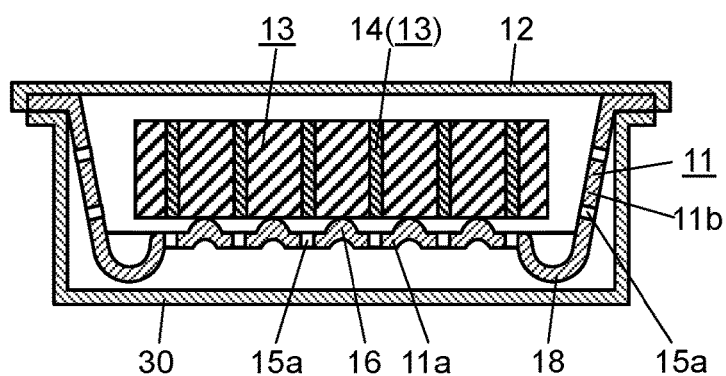
FIG. 5 is a sectional view illustrating an external container covering the first cooking container according to the first exemplary embodiment.

As illustrated in FIG. 5, external container 30 may be configured to cover first container 11, for example.

FIG. 5 is a sectional view illustrating an external container covering the first cooking container according to the first exemplary embodiment. Accordingly, the above problem can be prevented beforehand.

Further, first container 11 immediately after the heating is hot due to the heat transfer from heated first foodstuff 13 and the like. However, by covering first container 11 by external container 30, first container 11 itself is insulated. Accordingly, the heat transfer from first container 11 is reduced, and handling properties of first container 11 are further improved. Therefore, in the food-service industry, for example, the operation of a shop clerk who provides a heated foodstuff to customers becomes smooth. As a result, the foodstuff immediately after the heating can be quickly provided to customers.

In the present exemplary embodiment, explanations are made, taking a configuration example where the mounting surface of first container lid 12 on which second container 21 is mounted is a plane. However, the configuration is not limited to this example. For example, a concave part fitted with bottom surface 21a of second container 21 may be provided on the mounting surface of first container lid 12. Further, a convex part for positioning bottom surface 21a of second container 21 may be provided. Accordingly, second container 21 can be positioned, and displacement during the processing can be prevented. As a result, second foodstuff 23 in second container 21 can be effectively heated.

Second Exemplary Embodiment

Hereinafter, a configuration of a heating cooker provided with cooking container according to a second exemplary embodiment of the present invention will be described with reference to FIG. 6.

Figure 6:
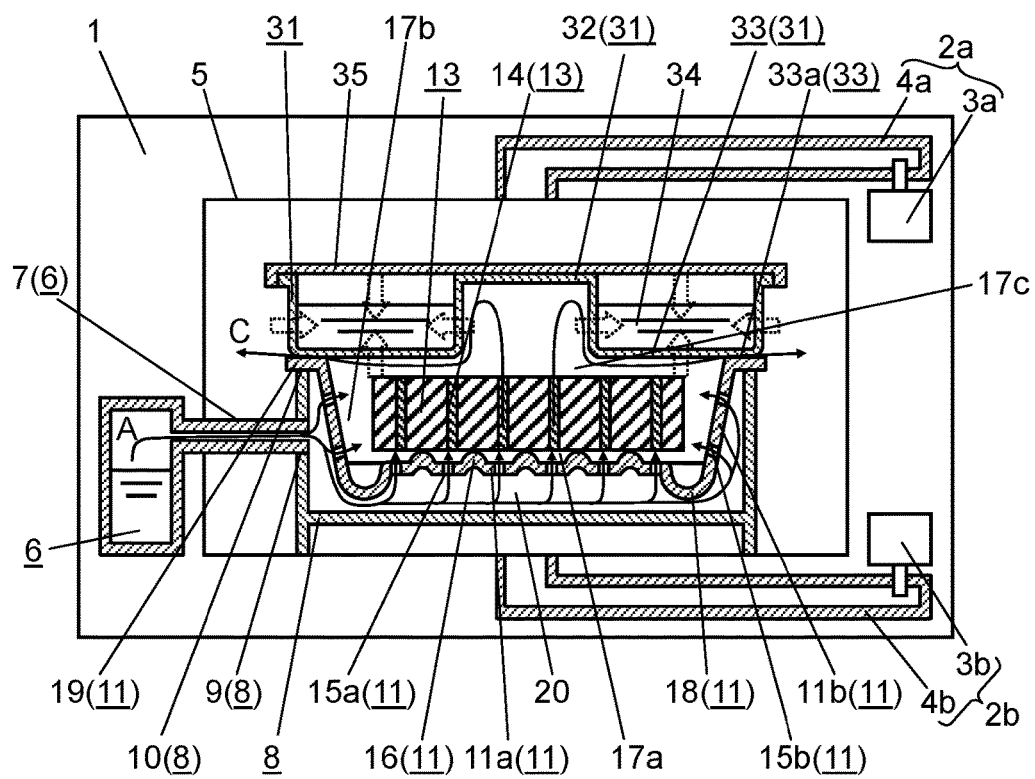
FIG. 6 is a sectional view illustrating a heating cooker provided with cooking container according to a second exemplary embodiment of the present invention.

FIG. 6 is a sectional view illustrating the heating cooker provided with cooking container according to the second exemplary embodiment of the present invention.

As illustrated in FIG. 6, the heating cooker provided with cooking container according to the present exemplary embodiment is configured by, for example, at least body 1 having cooking chamber 5, cooking-container mounting part 8, first cooking container 11 for accommodating first foodstuff 13, second container lid 35, second cooking container 31 for accommodating second foodstuff 34, steam generation device 6, and microwave generation devices 2a, 2b.

Further, the heating cooker provided with cooking container according to the present exemplary embodiment is different from that in the first exemplary embodiment in that convex part 32 and concave part 33 are provided on a bottom part of second cooking container 31 without providing the first container lid. Because other configurations and actions are similar to those in the first exemplary embodiment, a detailed description will be omitted. Hereinafter, first cooking container 11 will be referred to as a "first container", and second cooking container 31 will be referred to as a "second container".

That is, second container 31 in the present exemplary embodiment is formed of a polypropylene resin, for example, and includes convex part 32 formed on a bottom surface and protruding upward, and concave part 33 recessed downward. In concave part 33 of second container 31, second foodstuff 34 such as curry, for example, is accommodated.

Second container lid 35 is provided to cover an upper part of second container 31, and is formed of a polypropylene resin, for example.

At this time, a bottom surface of concave part 33 of second container 31 is disposed in contact with flange portion 19 of first container 11. Accordingly, the bottom surface of second container 31 functions as the lid of first container 11. As a result, the configuration can be simplified by omitting the first container lid described in the first exemplary embodiment.

The heating cooker provided with cooking container according to the present exemplary embodiment is configured as described above.

Hereinafter, operation and action of the heating cooker provided with cooking container according to the present exemplary embodiment will be described with reference to FIG. 6.

First, as illustrated in FIG. 6, container mounting part 8 is placed in cooking chamber 5 of body 1, for example, as in the first exemplary embodiment.

Next, first foodstuff 13 is accommodated in first container 11. Then, a lower surface of flange portion 19 at an upper end of first container 11 is locked to an opening end of steam outlet 10 of container mounting part 8.

Next, second foodstuff 34 is accommodated in second container 31, and second container lid 35 is applied to an upper part of second container 31.

Next, a bottom surface of concave part 33 of second container 31 is disposed in contact, on an upper surface of flange portion 19 of first container 11. Accordingly, the lid is applied to the opening part of first container 11.

Next, the door of body 1 of the heating cooker is closed.

Then, a predetermined condition is input, and the heating cooker is driven, via an operation unit (not illustrated) of body 1 of the heating cooker. Accordingly, microwave generation devices 2a, 2b and steam generation device 6 are driven.

When steam generation device 6 is driven, steam is fully supplied from steam discharge portion 7 into container mounting part 8. The supplied steam is supplied from opening holes 15a, 15b formed on first container 11 to spaces 17a, 17b, 17c in first container 11, via steam reservoir space 20 in container mounting part 8, as indicated by arrow A in FIG. 6. The steam reaches first foodstuff 13 accommodated in first container 11. Accordingly, the steam is supplied to first foodstuff 13 from the surrounding of first foodstuff 13 and the surfaces of communication holes 14. As a result, first foodstuff 13 is directly heated by the supplied steam. At this time, first foodstuff 13 in the present exemplary embodiment is frozen boiled-rice, for example. Therefore, the frozen boiled-rice can be finished into plump boiled rice by the action of the steam. Accordingly, the taste of the boiled rice is improved.

At the same time, first foodstuff 13 is heated by the microwaves via microwave generation devices 2a, 2b. As a result, by the heating using both the steam and the microwaves, a heating time of first foodstuff 13 can be shortened.

Further, in the present exemplary embodiment, bottom surface 33a of concave part 33 of second container 31 is configured to function as the lid of first container 11. Therefore, the steam having entered first container 11 is directly applied to convex part 32 and bottom surface 33a of concave part 33, of second container 31, as indicated by arrow C in FIG. 6. Accordingly, the heat of the steam is more easily transferred to second foodstuff 34 in second container 31. Then, the heat of the steam indirectly acts on second foodstuff 34. As a result, second foodstuff 34 can be cooked without reducing the taste.

Next, the steam having heated convex part 32 of second container 31 and bottom surface 33a of concave part 33 of second container 31 is discharged into cooking chamber 5, by passing the clearance between flange portion 19 of first container 11 and concave part 33 of second container 31. At this time, in the present exemplary embodiment, convex part 32 and concave part 33 are provided on a bottom surface of second container 31. Therefore, an area of the bottom surface of second container 31 applied with the steam increases. As a result, the heat of the steam can be more efficiently transferred to second foodstuff 34.

In general, in the case of heating a liquid with high viscosity (for example, curry of second foodstuff 34 in the present exemplary embodiment) by microwaves, according to the shape of second container 21 in the first exemplary embodiment, heating is concentrated near a side surface portion of an outer periphery of second container 21. Therefore, a center part of a foodstuff accommodated in second container 21 is not easily heated.

The reason for this is as follows. Microwaves enter a part near the side surface of the outer periphery of second container 21, and second container 21 is easily heated from two directions: a vertical direction and a lateral direction. On the other hand, the microwaves enter near the center part of second container 21 from only the vertical direction. Therefore, the center part of second container 21 is not easily heated.

Further, a liquid with high viscosity does not easily generate convection. Therefore, the above phenomenon that the center part of second container 21 is not easily heated occurs more remarkably.

Accordingly, in the present exemplary embodiment, convex part 32 is provided near the center part of the bottom surface of second container 31 so that second foodstuff 34 does not exist at the center part. Therefore, microwaves also enter a portion of convex part 32, as indicated by a broken arrow in FIG. 6. Accordingly, the microwaves heat second foodstuff 34, by uniformly acting on second foodstuff 34 from the surrounding of second foodstuff 34. As a result, second foodstuff 34 can be uniformly cooked.

The heating cooker provided with cooking container according to the present exemplary embodiment operates as described above.

In the present exemplary embodiment, explanations are made, taking a configuration example where the mounting surface of flange portion 19 of first container 11 on which second container 31 is mounted is a plane. However, the configuration is not limited to this example. For example, a concave part fitted with bottom surface 33a of concave part 33 of second container 31 may be provided on the mounting surface of flange portion 19 of first container 11. Further, a convex part for positioning second container 31 may be provided. Accordingly, second container 31 can be positioned, and displacement during the processing can be prevented. As a result, second foodstuff 34 in second container 31 can be effectively heated.

Third Exemplary Embodiment

Hereinafter, a configuration of a heating cooker provided with cooking container according to a third exemplary embodiment of the present invention will be described with reference to FIG. 7.

Figure 7:
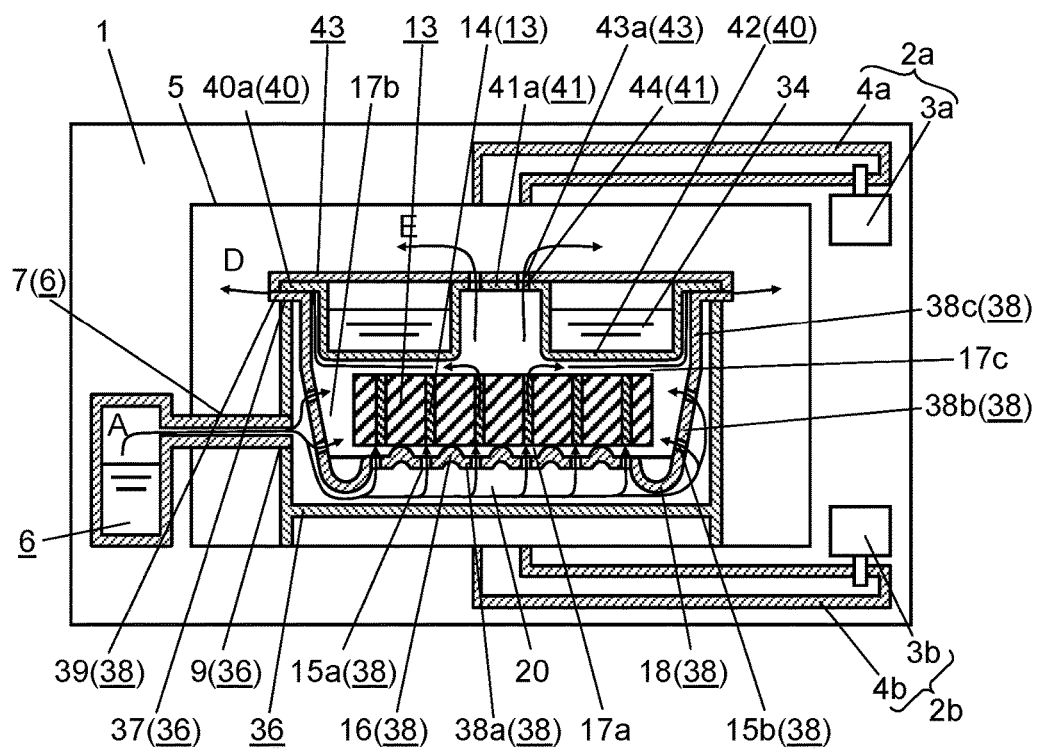
FIG. 7 is a sectional view illustrating a heating cooker provided with cooking container according to a third exemplary embodiment of the present invention.

FIG. 7 is a sectional view illustrating the heating cooker provided with cooking container according to the third exemplary embodiment of the present invention.

As illustrated in FIG. 7, the heating cooker provided with cooking container according to the present exemplary embodiment is configured by, for example, at least body 1 having cooking chamber 5, cooking-container mounting part 36, first cooking container 38 for accommodating first foodstuff 13, second container lid 43, second cooking container 40 for accommodating second foodstuff 34, steam generation device 6, and microwave generation devices 2a, 2b.

The heating cooker provided with cooking container according to the present exemplary embodiment is configured to accommodate second cooking container 40 in first cooking container 38 using high side walls. Further, the heating cooker according to the present exemplary embodiment is different from the heating cooker according to the second exemplary embodiment in that communicating steam vent holes 43a, 44 are provided on convex part 41 of second cooking container 40 and on second container lid 43 coving second cooking container 40. Because other configurations and actions are similar to those in the second exemplary embodiment, a detailed description will be omitted. Hereinafter, first cooking container 38 will be referred to as a "first container", and second cooking container 40 will be referred to as a "second container".

A configuration of first container 38 in the present exemplary embodiment will be described in detail below.

First container 38 is formed of a polypropylene resin, for example, and accommodates first foodstuff 13 inside. Accommodated first foodstuff 13 is frozen boiled-rice, for example.

First foodstuff 13 is provided in advance with a plurality of communication holes 14 inside first foodstuff 13, is formed in a substantially rectangular parallelepiped shape (including a rectangular parallelepiped shape), and is further solidified by freezing. Examples of first foodstuff 13 include frozen boiled-rice with red beans, and frozen pilaf, similar to frozen boiled-rice.

First container 38 includes opening holes 15a formed on bottom wall 38a, and opening holes 15b formed on inclined side wall 38b, for example. Accordingly, an inner space of first container 38 and an outer space (a space in container mounting part 8) are communicated via opening holes 15a, 15b.

Holding portion 16 composed of, for example, spherical projections having a convex surface above, is formed on bottom wall 38a of first container 38. Holding portion 16 holds first foodstuff 13 near the vertex of holding portion 16. At this time, space 17a is formed between first foodstuff 13 and bottom wall 38a of first container 38. Similarly, space 17b is formed between first foodstuff 13 and side wall 38b of first container 38, and space 17c is formed between first foodstuff 13 and second container 40.

Further, first container 38 includes foot portions 18 composed of spherical projections, for example, and having a convex surface below, at four positions on bottom wall 38a (refer to FIG. 2).

Further, first container 38 includes vertically-extending side wall 38c, above inclined side wall 38b that accommodates first foodstuff 13. Side wall 38c of first container 38 has a height in which second container 40 can be accommodated. Then, second container 40 is accommodated inside first container 38, by having flange portion 40a of second container 40 brought into contact with an upper surface of flange portion 39 of first container 38.

First container 38 is configured as described above.

First container 38 in the above configuration is placed from steam outlet 37 into container mounting part 36. Then, first container 38 is locked onto steam outlet 37 by flange portion 39 formed at an upper end. Accordingly, first container 38 is accommodated and set in container mounting part 36. At this time, steam reservoir space 20 constituting a closed space is formed between container mounting part 36 and first container 38.

Second container 40 is formed of a polypropylene resin, for example, and includes convex part 41 formed on a bottom surface and protruding upward, and concave part 42 recessed downward. In concave part 42 of second container 40, second foodstuff 34 such as curry, for example, is accommodated. Further, on upper surface 41a of convex part 41 of second container 40, piercing steam vent holes 44 are formed Second container lid 43 is provided to cover an upper part of second container 40, and is formed of a polypropylene resin, for example. On second container lid 43, steam vent holes 43a are formed at positions corresponding to steam vent holes 44 of second container 40. Accordingly, as described later, the steam introduced into first container 38 is discharged into cooking chamber 5 via steam vent holes 44 of second container 40 and steam vent holes 43a of second container lid 43.

The heating cooker provided with cooking container according to the present exemplary embodiment is configured as described above.

Hereinafter, operation and action of the heating cooker provided with cooking container according to the present exemplary embodiment will be described with reference to FIG. 7.

First, as illustrated in FIG. 7, first foodstuff 13 is accommodated in first container 38, and second foodstuff 34 is accommodated in second container 40, as in the second exemplary embodiment.

Next, second container 40 is accommodated in first container 38, and second container lid 43 is applied to second container 40.

Next, in the above state, a lower surface of flange portion 39 at an upper end of first container 38 is locked to an opening end of steam outlet 37 of container mounting part 36. Accordingly, first container 38 and second container 40 are accommodated in container mounting part 36.

Next, the door of body 1 of the heating cooker is closed.

Then, a predetermined condition is input, and the heating cooker is driven, via an operation unit (not illustrated) of body 1 of the heating cooker. Accordingly, microwave generation devices 2a, 2b and steam generation device 6 are driven.

When steam generation device 6 is driven, steam is fully supplied from steam discharge portion 7 into container mounting part 36. The supplied steam is supplied from opening holes 15a, 15b formed on first container 38 to spaces 17a, 17b, 17c in first container 38, via steam reservoir space 20 in container mounting part 36, as indicated by arrow A in FIG. 7. The steam reaches first foodstuff 13 accommodated in first container 38. Accordingly, the steam is supplied to first foodstuff 13 from the surrounding of first foodstuff 13 and the surfaces of communication holes 14. As a result, first foodstuff 13 is directly heated by the supplied steam. At this time, first foodstuff 13 in the present exemplary embodiment is frozen boiled-rice, for example. Therefore, the frozen boiled-rice can be finished into plump boiled rice by the action of the steam. Accordingly, the taste of the boiled rice is improved.

At the same time, first foodstuff 13 is heated by the microwaves via microwave generation devices 2a, 2b. As a result, by the heating using both the steam and the microwaves, a heating time of first foodstuff 13 can be shortened.

Further, in the present exemplary embodiment, second container 40 is configured to be accommodated in first container 38. Therefore, the steam that enters first container 38 is directly applied to a bottom surface of second container 40, as indicated by arrow D in FIG. 7. Accordingly, the heat of the steam is more easily transferred to second foodstuff 34 in second container 40. Then, the heat of the steam indirectly acts on second foodstuff 34. As a result, second foodstuff 34 can be cooked without reducing the taste.

Next, a part of the steam having heated the bottom surface of second container 40 is discharged into cooking chamber 5 through the clearance between flange portion 39 of first container 38 and second container 40, as indicated by arrow D in FIG. 7.

In the present exemplary embodiment, steam vent holes 44, 43a are provided on convex part 41 of second container 40 and on second container lid 43. Therefore, a part of the steam having heated first foodstuff 13 flows so as to be discharged to cooking chamber 5, via steam vent holes 44, 43a, as indicated by arrow E in FIG. 7. At this time, the steam is directly applied to a wall surface of convex part 41 of second container 40. Then, the heat of the steam is transferred to second foodstuff 34 via the wall surface of convex part 41 of second container 40. Accordingly, the heat of the steam indirectly acts on second foodstuff 34, and cooks second foodstuff 34.

Further, in the present exemplary embodiment, as in the second exemplary embodiment, convex part 41 is provided near the center part of the bottom surface of second container 40 so that second foodstuff 34 does not exist at the center part. Therefore, microwaves also enter a portion of convex part 41, as described with reference to FIG. 6. Accordingly, the microwaves heat second foodstuff 34, by uniformly acting on second foodstuff 34 from the surrounding of second foodstuff 34. As a result, second foodstuff 34 can be uniformly cooked.

The heating cooker provided with cooking container according to the present exemplary embodiment operates as described above.

Further, in the present exemplary embodiment, second container 40 is accommodated in, and integrally configured with, first container 38. Accordingly, handling properties of the cooking containers are improved. Therefore, in the food-service industry, for example, cooked foods can be efficiently provided to customers. In this case, the external container (not illustrated) may be used, as described in the first exemplary embodiment. Accordingly, leakage of the condensed hot water and the like from opening holes 15a and the like can be prevented. As a result, hygienic and high-level safety can be maintained.

In the present exemplary embodiment, explanations are made, taking a configuration example where second container 40 is accommodated in side wall 38b of first container 38. However, the configuration is not limited to this example. For example, a bottom surface of concave part 42 of second container 40 may be configured to be disposed in contact with flange portion 39 of first container 38, as in the second exemplary embodiment. In this case, shapes and sizes of first container 38 and second container 40 need to be in a similar size relationship to that in the second exemplary embodiment.

Fourth Exemplary Embodiment

Hereinafter, a configuration of a heating cooker provided with cooking container according to a fourth exemplary embodiment of the present invention will be described with reference to FIG. 8.

Figure 8:
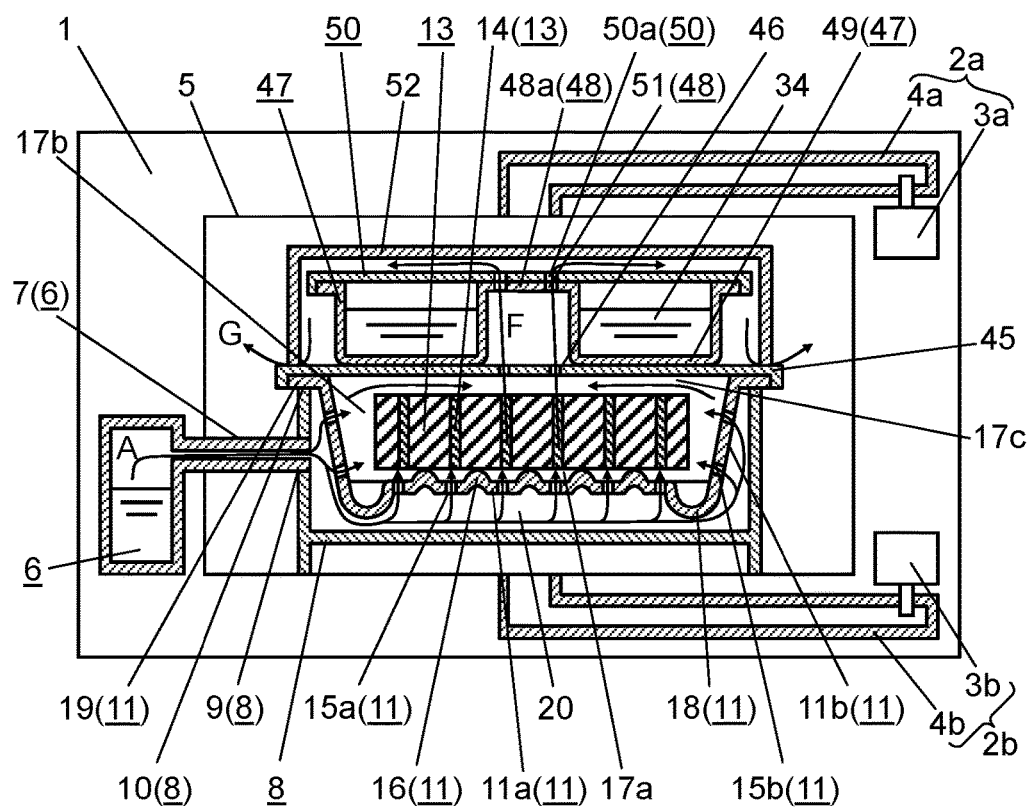
FIG. 8 is a sectional view illustrating a heating cooker provided with cooking container according to a fourth exemplary embodiment of the present invention.

FIG. 8 is a sectional view illustrating the heating cooker provided with cooking container according to the fourth exemplary embodiment of the present invention.

As illustrated in FIG. 8, the heating cooker provided with cooking container according to the present exemplary embodiment is configured by, for example, at least body 1 having cooking chamber 5, cooking-container mounting part 8, first container lid 45, first cooking container 11 for accommodating first foodstuff 13, second container lid 50, second cooking container 47 for accommodating second foodstuff 34, container cover 52, steam generation device 6, and microwave generation devices 2a, 2b.

Further, in the heating cooker provided with cooking container according to the present exemplary embodiment, steam through holes 46 are provided on first container lid 45, and convex part 48 and concave part 49 are provided on a bottom part of second cooking container 47. Then, steam vent holes 51 are provided on convex part 48 of second cooking container 47, and steam vent holes 50a are provided on second container lid 50. Further, the heating cooker according to the present exemplary embodiment is different from the heating cooker according to the first exemplary embodiment in that container cover 52 for accommodating second cooking container 47 is provided inside in contact with first container lid 45. Because other configurations and actions are similar to those in the first exemplary embodiment, a detailed description will be omitted. Hereinafter, first cooking container 11 will be referred to as a "first container", and second cooking container 47 will be referred to as a "second container".

That is, first container lid 45 in the present exemplary embodiment is provided to cover an upper part of first container 11, and is formed of a polypropylene resin, for example. On first container lid 45, steam through holes 46 are formed near a center part corresponding to convex part 48 of second container 47 described later.

Second container 47 is formed of a polypropylene resin, for example, and includes convex part 48 and concave part 49 on a bottom surface. In concave part 49 of second container 47, second foodstuff 34 such as curry, for example, is accommodated. On upper surface 48a of convex part 48 of second container 47, piercing steam vent holes 51 are formed.

Second container lid 50 is provided to cover an upper part of second container 47, and is formed of a polypropylene resin, for example. At this time, second container 47 is disposed by having a bottom surface brought into surface contact on first container lid 45.

On second container lid 50, steam vent holes 50a are formed at positions corresponding to steam vent holes 51 of second container 47. Accordingly, the steam introduced into first container 11 is introduced into convex part 48 of second container 47 via steam through holes 46 of first container lid 45. Then, the introduced steam is discharged into container cover 52 described later, via steam vent holes 51 of second container 47 and steam vent holes 50a of second container lid 50.

Container cover 52 is disposed on first container lid 45 in contact with first container lid 45, and covers second container 47 inside. Container cover 52 is formed of a polypropylene resin, for example.

The heating cooker provided with cooking container according to the present exemplary embodiment is configured as described above.

Hereinafter, operation and action of the heating cooker provided with cooking container according to the present exemplary embodiment will be described with reference to FIG. 8.

First, as illustrated in FIG. 8, first foodstuff 13 is accommodated in first container 11, and second foodstuff 34 is accommodated in second container 47, as in the first exemplary embodiment. Then, first container lid 45 is applied to the opening of first container 11, and second container lid 50 is applied to the opening of second container 47.

Next, second container 47 is disposed in surface contact with first container lid 45. Then, container cover 52 is disposed in contact with first container lid 45, so as to accommodate second container 47.

Next, in the above state, flange portion 19 of first container 11 is accommodated in cooking chamber 5 by having flange portion 19 brought into contact with steam outlet 10 of container mounting part 8. Then, the door of body 1 of the heating cooker is closed.

Next, a predetermined condition is input, and the heating cooker is driven, via an operation unit (not illustrated) of body 1 of the heating cooker. Accordingly, microwave generation devices 2a, 2b and steam generation device 6 are driven.

When steam generation device 6 is driven, steam is fully supplied from steam discharge portion 7 into container mounting part 8. The supplied steam reaches first foodstuff 13, via steam reservoir space 20 in container mounting part 8, opening holes 15a, 15b, and spaces 17a, 17b, 17c, as indicated by arrow A in FIG. 8. Then, the steam is supplied from the surrounding of first foodstuff 13 and the surfaces of communication holes 14. Accordingly, the steam directly acts on first foodstuff 13. As a result, first foodstuff 13 can be easily heated by the supplied steam. At this time, first foodstuff 13 is frozen boiled-rice, for example. Therefore, the frozen boiled-rice can be finished into plump boiled rice by the action of the steam. Accordingly, the taste of the boiled rice is improved.

At the same time, first foodstuff 13 is heated by the microwaves via microwave generation devices 2a, 2b. As a result, by the heating using both the steam and the microwaves, a heating time of first foodstuff 13 can be shortened.

Further, in the present exemplary embodiment, concave part 49 of second container 47 is disposed in surface contact, on first container lid 45 which is applied to first container 11. Therefore, the heat of the steam having warmed up the inside of first container 11 is transferred to second foodstuff 34, via first container lid 45 and concave part 49 of second container 47. At this time, the steam indirectly acts on second foodstuff 34. As a result, second foodstuff 34 can be cooked without reducing the taste.

Further, a part of the steam introduced into first container 11 enters convex part 48 of second container 47 via steam through holes 46 provided on first container lid 45, as indicated by arrow F in FIG. 8. Then, the heat of the steam is transferred indirectly to second foodstuff 34, via a side wall of convex part 48. The steam having passed convex part 48 of second container 47 is discharged into container cover 52 via steam vent holes 51 of second container 47 and steam vent holes 50a of second container lid 50. Then, the discharged steam flows in container cover 52. Accordingly, second container 47 and second container lid 50 are warmed up entirely.

Thereafter, as indicated by arrow G in FIG. 8, a part of the steam is discharged from the clearance between first container lid 45 and container cover 52. That is, the heat of the steam indirectly acts on second foodstuff 34. Accordingly, a heating time of second foodstuff 34 can be more effectively shortened without reducing the taste. As a result, heating performance of second foodstuff 34 in second container 47 can be further improved.

Further, in the present exemplary embodiment, as in the second and third exemplary embodiments, convex part 48 is provided near the center part of the bottom surface of second container 47 so that second foodstuff 34 does not exist at the center part. Therefore, microwaves also enter a portion of convex part 48, as described with reference to FIG. 6. Accordingly, the microwaves heat second foodstuff 34, by uniformly acting on second foodstuff 34 from the surrounding of second foodstuff 34. As a result, second foodstuff 34 can be uniformly cooked.

The heating cooker provided with cooking container according to the present exemplary embodiment operates as described above.

In the present exemplary embodiment, explanations are made, taking a configuration example where the mounting surface of first container lid 45 on which second container 47 is mounted is a plane. However, the configuration is not limited to this example. For example, a concave part fitted with the bottom surface of second container 47 may be provided on the mounting surface of first container lid 45. Further, a convex part for positioning the bottom surface of second container 47 may be provided. Similarly, a groove and a convex part positioned with container cover 52 may be provided in first container lid 45. Accordingly, second container 47 and container cover 52 can be positioned, and displacement during the processing can be prevented. As a result, second foodstuff 34 in second container 47 can be effectively heated.

Fifth Exemplary Embodiment

Hereinafter, a configuration of a heating cooker provided with cooking container according to a fifth exemplary embodiment of the present invention will be described with reference to FIG. 9.

Figure 9:
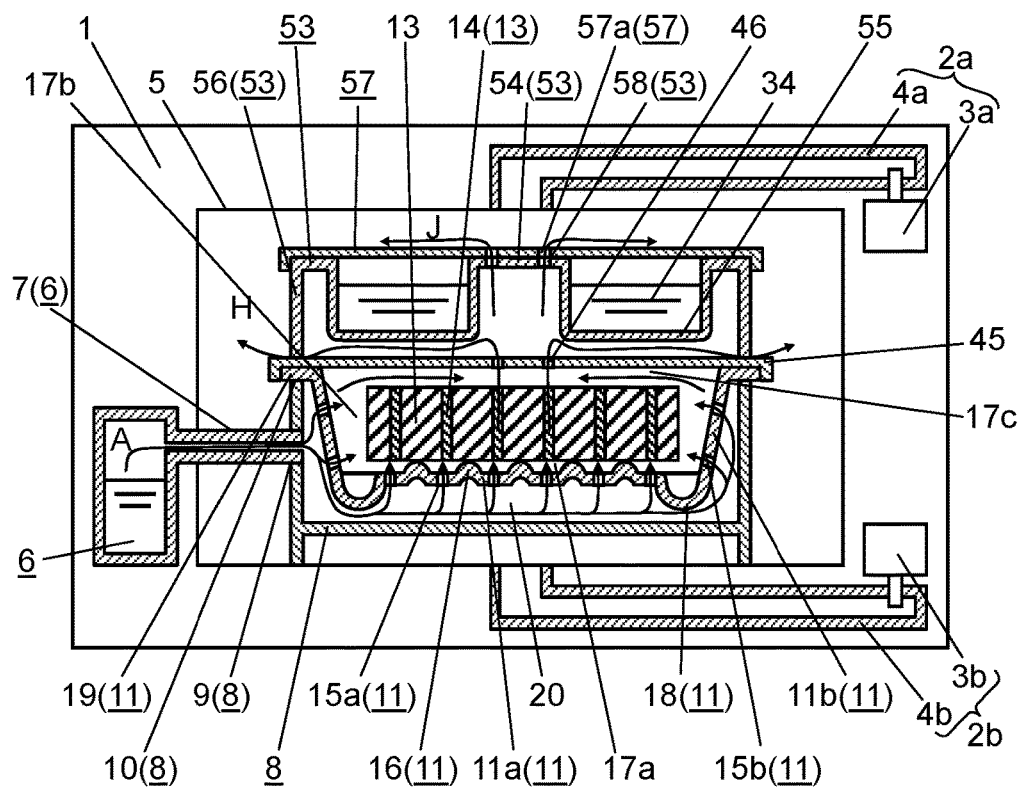
FIG. 9 is a sectional view illustrating a heating cooker provided with cooking container according to a fifth exemplary embodiment of the present invention.

FIG. 9 is a sectional view illustrating the heating cooker provided with cooking container according to the fifth exemplary embodiment of the present invention.

As illustrated in FIG. 9, the heating cooker provided with cooking container according to the present exemplary embodiment is configured by, for example, at least body 1 having cooking chamber 5, cooking-container mounting part 8, first container lid 45, first cooking container 11 for accommodating first foodstuff 13, second container lid 57, second cooking container 53 for accommodating second foodstuff 34, steam generation device 6, and microwave generation devices 2a, 2b.

The heating cooker provided with cooking container according to the present exemplary embodiment is different from the heating cooker in the fourth exemplary embodiment in that a side wall is provided on the second cooking container without providing a container cover and that a bottom part of the side wall is disposed in contact with the first container lid. Because other configurations and actions are similar to those in the fourth exemplary embodiment, a detailed description will be omitted. Hereinafter, first cooking container 11 will be referred to as a "first container", and second cooking container 53 will be referred to as a "second container".

That is, first container lid 45 is provided to cover an upper part of first container 11, and is formed of a polypropylene resin, for example. On first container lid 45, steam through holes 46 are formed near a center part corresponding to convex part 54 of second container 53 described later.

Second container 53 is formed of a polypropylene resin, for example, and includes convex part 54 and concave part 55 on a bottom surface. In concave part 55 of second container 53, second foodstuff 34 such as curry, for example, is accommodated.

Further, a side surface of second container 53 includes side wall 56 extending in an L shape, for example, from an outer periphery end of concave part 55. At this time, the end part of side wall 56 of second container 53 is extended to a lower position than the bottom surface of concave part 55. Then, the end part of side wall 56 of second container 53 is disposed in contact on an upper surface of first container lid 45. Accordingly, the bottom surface of concave part 55 of second container 53 is disposed to be separated from the upper surface of first container lid 45.

Second container lid 57 is provided to cover an upper part of second container 53, and is formed of a polypropylene resin, for example. On second container lid 57, steam vent holes 57a are formed at positions corresponding to steam vent holes 58 of second container 53. Accordingly, the steam introduced into first container 11 is introduced into convex part 54 of second container 53 via steam through holes 46 of first container lid 45. Then, the introduced steam is discharged into cooking chamber 5, via steam vent holes 58 of second container 53 and steam vent holes 57a of second container lid 57.

The heating cooker provided with cooking container according to the present exemplary embodiment is configured as described above.

Hereinafter, operation and action of the heating cooker provided with cooking container according to the present exemplary embodiment will be described with reference to FIG. 9. The content overlapped with that of the fourth exemplary embodiment may be omitted.

First, as illustrated in FIG. 9, first foodstuff 13 is accommodated in first container 11, and second foodstuff 34 is accommodated in second container 53, as in the fourth exemplary embodiment. Then, first container lid 45 is applied to the opening of first container 11, and second container lid 57 is applied to the opening of second container 53.

Next, side wall 56 of second container 53 is disposed in contact, on first container lid 45.

Next, in the above state, flange portion 19 of first container 11 is accommodated in cooking chamber 5 by having flange portion 19 brought into contact with steam outlet 10 of container mounting part 8. Then, the door of body 1 of the heating cooker is closed.

Next, a predetermined condition is input, and the heating cooker is driven, via an operation unit (not illustrated) of body 1 of the heating cooker. Accordingly, microwave generation devices 2a, 2b and steam generation device 6 are driven.

When steam generation device 6 is driven, steam is fully supplied from steam discharge portion 7 into container mounting part 8. The supplied steam reaches first foodstuff 13, via steam reservoir space 20, opening holes 15a, 15b, and spaces 17a, 17b, 17c, as indicated by arrow A in FIG. 9. Then, the steam is supplied from the surrounding of first foodstuff 13 and the surfaces of communication holes 14. Accordingly, the steam directly acts on first foodstuff 13. As a result, first foodstuff 13 can be easily heated by the supplied steam. At this time, first foodstuff 13 is frozen boiled-rice, for example. Therefore, the frozen boiled-rice can be finished into plump boiled rice by the action of the steam. Accordingly, the taste of the boiled rice is improved.

At the same time, first foodstuff 13 is heated by the microwaves via microwave generation devices 2a, 2b. As a result, by the heating using both the steam and the microwaves, a heating time of first foodstuff 13 can be shortened.

Next, in the present exemplary embodiment, a part of the steam is supplied into second container 53, from steam through holes 46 provided on first container lid 45 of first container 11. The supplied steam passes the bottom surface of concave part 55 of second container 53, as indicated by arrow H in FIG. 9. At this time, the heat of the steam is transferred indirectly to second foodstuff 34, via walls of concave part 55 and convex part 54 of second container 53. Then, the steam is discharged into cooking chamber 5 from the clearance between first container lid 45 and side wall 56 on second container 53.

Further, a part of the steam introduced into second container 53 passes convex part 54 of second container 53, and is discharged into cooking chamber 5 from steam vent holes 57a, 58 of second container 53 and second container lid 57, as indicated by arrow J in FIG. 9. At this time, in a similar manner to that described above, the heat of the steam is transferred indirectly to second foodstuff 34, via the wall of convex part 54 of second container 53. Then, the heat of the steam indirectly heats second foodstuff 34. Accordingly heating performance of second foodstuff 34 is improved.

Further, side wall 56 of second container 53 encloses the steam into the surrounding of concave part 55 of second container 53. Accordingly, the heat of the steam can be indirectly transferred to a whole part of concave part 55 of second container 53 excluding the upper surface. As a result, the heat of the steam can be efficiently transferred to second foodstuff 34.

Further, in the present exemplary embodiment, as in the second to fourth exemplary embodiments, convex part 54 is provided near the center part of the bottom surface of second container 53 so that second foodstuff 34 does not exist at the center part. Therefore, microwaves also enter a portion of convex part 54, as described with reference to FIG. 6. Accordingly, the microwaves heat second foodstuff 34, by uniformly acting on second foodstuff 34 from the surrounding of second foodstuff 34. As a result, second foodstuff 34 can be uniformly cooked.

The heating cooker provided with cooking container according to the present exemplary embodiment operates as described above.

In the present exemplary embodiment, explanations are made, taking a configuration example where the steam flows as indicated by arrow J in FIG. 9 by steam vent holes 57a, 58. However, the configuration is not limited to this example. When the heating performance of second foodstuff 34 is improved by increasing the flow quantity of the steam indicated by arrow H in FIG. 9, steam vent holes 58 may be small or omitted. That is, the flow quantity of the steam may be adjusted by arbitrarily setting sizes of steam vent holes 58, in accordance with a kind and a quantity of second foodstuff 34.

In the present exemplary embodiment, explanations are made, taking a configuration example where steam through holes 46 are provided in first container lid 45 at positions corresponding to convex part 54 of second container 53. However, the configuration is not limited to this example. For example, steam through holes 46 may be provided in a whole of first container lid 45. In this case, steam through holes 46 need to be provided so that first foodstuff 13 in first container 11 is sufficiently heated by the steam.

In the present exemplary embodiment, explanations are made, taking a configuration example where first container lid 45 is provided for applying to first container 11. However, a configuration is not limited to this example. For example, by omitting first container lid 45, a bottom part of side wall 56 of second container 53 may be configured to be brought into contact with flange portion 19 of first container 11. In this case, steam vent holes 57a, 58 of second container 53 and second container lid 57 need to be provided by setting numbers and shapes so that first foodstuff 13 in first container 11 can be sufficiently heated by the steam.

In the present exemplary embodiment, explanations are made, taking a configuration example where a surface of first container lid 45 brought into contact with side wall 56 of second container 53 is a plane. However, the configuration is not limited to this example. For example, a groove and a convex part to be positioned with the bottom part of side wall 56 of second container 53 may be provided on a contact surface of first container lid 45. Accordingly, second container 53 can be positioned, and displacement during the processing can be prevented. As a result, second foodstuff 34 in second container 53 can be effectively heated.

Sixth Exemplary Embodiment

Hereinafter, a configuration of a heating cooker provided with cooking container according to a sixth exemplary embodiment of the present invention will be described with reference to FIG. 10.

Figure 10:
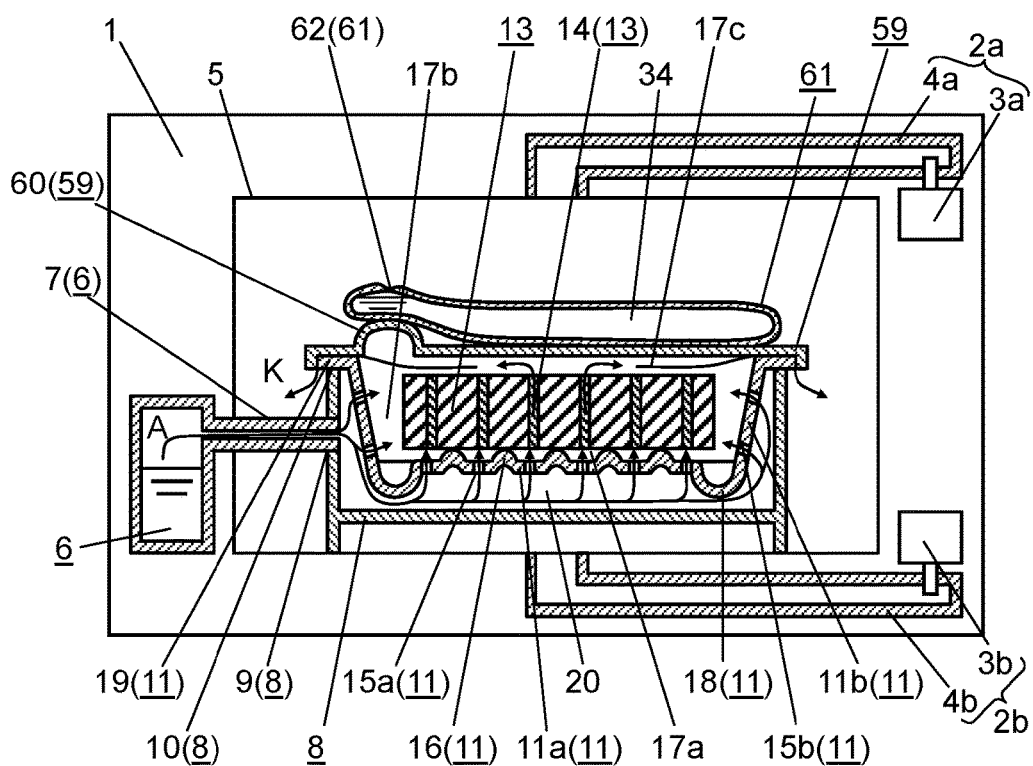
FIG. 10 is a sectional view illustrating a heating cooker provided with cooking container according to a sixth exemplary embodiment of the present invention.

FIG. 10 is a sectional view illustrating the heating cooker provided with cooking container according to the sixth exemplary embodiment of the present invention.

As illustrated in FIG. 10, the heating cooker provided with cooking container according to the present exemplary embodiment is configured by, for example, at least body 1 having cooking chamber 5, cooking-container mounting part 8, first container lid 59, first cooking container 11 for accommodating first foodstuff 13, second cooking container 61 for accommodating second foodstuff 34, steam generation device 6, and microwave generation devices 2a, 2b.

The heating cooker provided with cooking container according to the present exemplary embodiment is different from the heating cooker according to the first exemplary embodiment in that ledge 60 is provided in first container lid 59 and that second cooking container 61 is configured in a bag shape. Because other configurations and actions are similar to those in the first exemplary embodiment, a detailed description will be omitted. Hereinafter, first cooking container 11 will be referred to as a "first container", and second cooking container 61 will be referred to as a "second container".

That is, first container lid 59 according to the present exemplary embodiment includes ledge 60 on the upper surface, and is provided to cover the upper part of first container 11.

Second container 61 is configured in a bag shape, for example, and accommodates second foodstuff 34 such as curry, for example. Further, second container 61 includes steam release section 62 formed by, for example, reducing thickness of a bag. Steam release section 62 releases the steam from second container 61 when the steam generated from inside second foodstuff 34 has a pressure equal to or higher than a predetermined value during the heating. Accordingly, burst and the like of second container 61 can be prevented.

Then, the whole of second container 61 is mounted on the upper surface of first container lid 59. At this time, preferably, steam release section 62 of second container 61 is placed to face upward, on ledge 60 of first container lid 59. Accordingly, even when the steam is leaked from second container 61, overspill of second foodstuff 34 and the like can be prevented beforehand.

The heating cooker provided with cooking container according to the present exemplary embodiment is configured as described above.

Hereinafter, operation and action of the heating cooker provided with cooking container according to the present exemplary embodiment will be described with reference to FIG. 10. The content overlapped with that of the first exemplary embodiment will be omitted.

First, as illustrated in FIG. 10, first foodstuff 13 is accommodated in first container 11, and second foodstuff 34 is accommodated in second container 61. Then, first container lid 59 is applied to the opening of first container 11, and second container 53 is disposed on an upper surface of first container lid 59.

Next, in the above state, flange portion 19 of first container 11 is accommodated in cooking chamber 5 by having flange portion 19 brought into contact with steam outlet 10 of container mounting part 8. Then, the door of body 1 of the heating cooker is closed.

Next, a predetermined condition is input, and the heating cooker is driven, via an operation unit (not illustrated) of body 1 of the heating cooker. Accordingly, microwave generation devices 2a, 2b and steam generation device 6 are driven.

When steam generation device 6 is driven, steam is fully supplied from steam discharge portion 7 into container mounting part 8. The supplied steam reaches first foodstuff 13, via steam reservoir space 20, opening holes 15a, 15b, and spaces 17a, 17b, 17c, as indicated by arrow A in FIG. 10. Then, the steam is supplied from the surrounding of first foodstuff 13 and the surfaces of communication holes 14. Accordingly, the steam directly acts on first foodstuff 13. As a result, first foodstuff 13 can be easily heated by the supplied steam. At this time, frozen boiled-rice is used, for example, as first foodstuff 13. Therefore, the frozen boiled-rice can be finished into plump boiled rice by the action of the steam. Accordingly, the taste of the boiled rice is improved.

At the same time, first foodstuff 13 is heated by the microwaves via microwave generation devices 2a, 2b. As a result, by the heating using both the steam and the microwaves, a heating time of first foodstuff 13 can be shortened.

Next, the steam introduced into first container 11 warms up first foodstuff 13 and first container lid 59. Then, the introduced steam is discharged from the clearance between first container 11 and first container lid 59, as indicated by arrow K in FIG. 10. At this time, bag-shaped second container 61 is disposed on an upper surface of warmed-up first container lid 59. Therefore, the heat of the steam introduced into first container 11 is transferred to an exterior of second container 61 via first container lid 59. Then, the heat is transferred to second foodstuff 34 from the exterior of second container 61. Accordingly, the steam indirectly acts on second foodstuff 34. As a result, second foodstuff 34 can be effectively heated without reducing the taste of second foodstuff 34.

Further, the microwaves heat second foodstuff 34, by also acting on second container 61 in a similar manner to that applied to first foodstuff 13. Accordingly, second foodstuff 34 completely sealed by bag-shaped second container 61 is heated by indirect heat of the steam and the microwaves.

At this time, steam release section 62 is configured to release the steam when a pressure of the steam generated from second foodstuff 34 becomes equal to or higher than a predetermined value due to the heating. However, during the heating of second foodstuff 34, there is considered a case where steam release section 62 is torn by the pressure and second foodstuff 34 jumps out when the pressure is released.

In the present exemplary embodiment, in advance, steam release section 62 of second container 61 is disposed to face upward, on ledge 60 of first container lid 59. Accordingly, the quantity of second foodstuff 34 becomes small around steam release section 62 of second container 61. Therefore, even when the steam is released in a torn state of steam release section 62, splattering of second foodstuff 34 can be suppressed.

Further, second container 61 is mounted at the outside of first container lid 59. Therefore, even when second foodstuff 34 is splattered outside, first container lid 59 and the like can prevent the scattered foodstuff from entering first foodstuff 13. Accordingly, reduction in the taste of first foodstuff 13 can be prevented.

The heating cooker provided with cooking container according to the present exemplary embodiment operates as described above.

In the first to sixth exemplary embodiments, explanations are made, taking a configuration example where the flange portion of the first container is mounted on the steam outlet of the container mounting part, and the steam is introduced from the opening holes formed on the bottom wall and the side wall of the first container. However, the configuration is not limited to this example. For example, the configuration may be such that the steam is introduced into the first container, using only the opening holes of the bottom wall of the first container. That is, dispositions and configurations of the opening holes may be arbitrary, so far as the steam can be introduced into the first container by using the container mounting part.

In the case of introducing the steam from the opening holes of the bottom wall of the first container, the steam outlet of the container mounting part is made small in accordance with the size of the bottom surface of the first container. Then, an outer periphery of the first container may be configured to be disposed in contact with steam outlet 10.

In the above configuration, a large portion of the first container is exposed from the container mounting part. Therefore, the side wall of the first container and the side wall of the second container are placed side by side and close to each other. Accordingly, the configuration may be such that the heat of the steam introduced into the first container is transferred to the second container via the side wall and heat the second foodstuff.

In the first to sixth exemplary embodiments, explanations are made based on a shape example where each of the first container, the first foodstuff, and the second container is formed in a rectangle shape in a plan view. However, the shape is not limited to this example. For example, the first container, the first foodstuff, and the second container may be formed in a round shape or an elliptical shape in a plan view. That is, the first foodstuff may be in an arbitrary shape so far as the first foodstuff can be directly heated by the steam and can be heated by the microwaves. Further, the second foodstuff may be in an arbitrary shape so far as the second foodstuff can be indirectly heated by the heat that has heated the first foodstuff and can be heated by the microwaves.

In the first to sixth exemplary embodiments, explanations are made, taking a configuration example where the first container, the first container lid, the second container, the second container lid, and the container mounting part are formed of a polypropylene resin. However, the configuration is not limited to this example. For example, a resin material used may have a heat-resistant temperature above a predetermined temperature, and has a dissolution quantity below a reference value in the dissolution test. In this case, preferably, the material efficiently transmits microwaves.

In the first to sixth exemplary embodiments, explanations are made based on a configuration example where the thickness of the holding portion of the first container is set constant, and spherical projections are formed. However, the configuration is not limited to this example. For example, the holding portion may be in a linear rib shape. When a first foodstuff side is configured to be able to easily pass the steam, the holding portion may be omitted. That is, the first container may be configured to introduce the steam to the first foodstuff through the opening holes of the first container. In the first to sixth exemplary embodiments, explanations are made, taking a configuration example where the microwaves are output (radiated) from the upper surface and the bottom surface of cooking chamber 5. However, the configuration is not limited to this example. For example, the cooking chamber may be configured to output the microwaves from any one of the upper surface and the bottom surface of the cooking chamber. That is, the cooking chamber may be configured to be able to heat the first foodstuff and the second foodstuff by the heating using the steam and the microwaves.

In the first to sixth exemplary embodiments, explanations are made, taking a configuration example where the steam discharge portion of the steam generation device is inserted into the steam inlet, and the steam is introduced to the container mounting part. However, the configuration is not limited to this example. For example, a separate connection member may be used to connect between the steam generation device and the container mounting part. That is, the configuration of steam generation device 6 is arbitrary so far as steam generation device 6 can send steam to the container mounting part.

Further, in the first to fifth exemplary embodiments, explanations are made, taking a configuration example where a gap between the second container and the second container lid is not sealed. Therefore, even when steam or the like occurs due to the heating of the accommodated foodstuff and the internal pressure of the second container increases, burst will not occur. However, the second container may be formed in a sealed structure, for example. In this case, preferably the second container is configured to be provided with a steam release section that releases the steam by partly breaking the second container, when the steam pressure becomes equal to or higher than a predetermined value.

In the second to fifth exemplary embodiments, explanations are made, taking a configuration example where one convex part is provided near the center of the bottom surface of the second container. However, the configuration is not limited to this example. For example, number and positions of the convex parts provided in the second container may be adjusted in accordance with a state of a temperature distribution of heated second foodstuff 34. Accordingly, the second foodstuff can be heated more uniformly and efficiently.

In the second to sixth exemplary embodiments, explanations are made, taking a configuration example where frozen boiled-rice is used for the first foodstuff and curry is used for the second foodstuff. However, the configuration is not limited to this example. For example, various foodstuffs described in the first exemplary embodiment may be combined together. That is, the combination may be arbitrary, so far as a material whose taste is improved by direct heating by the steam is used for the first foodstuff, and a material whose taste is reduced by the direct heating by the steam is used for the second foodstuff.

As described above, the heating cooker provided with cooking container according to the present invention includes a cooking chamber provided inside a body of the heating cooker and having a door openably provided in a front opening part, a microwave generation device that transfers microwaves to the cooking chamber via a wave guide, a steam generation device installed in the body, and a cooking-container mounting part provided in the cooking chamber. The heating cooker further includes a steam discharge portion having a first end installed in the steam generation device and having a second end inserted into the cooking-container mounting part, a first cooking container accommodated in the cooking-container mounting part and accommodating a first foodstuff, and a first container lid covering an upper part of the first cooking container. The heating cooker further includes a second cooking container provided close to the first cooking container, partitioned from the first cooking container and accommodating a second foodstuff, and an opening hole provided in the first cooking container and communicating between a space in the first cooking container and a space in the cooking-container mounting part. The microwave generation device radiates the first cooking container and the second cooking container with the microwaves. The steam generation device introduces steam into the first cooking container via the opening hole. Then, the configuration may be such that the steam directly heats the first foodstuff accommodated in the first cooking container, and indirectly heats the second foodstuff accommodated in the second cooking container.

According to this configuration, the first cooking container is installed in the cooking-container mounting part, and the steam generated by the steam generation device is introduced into the first cooking container. Accordingly, the first foodstuff in the first cooking container is heated by the steam. At this time, in the first cooking container, the foodstuff (boiled rice, steamed meat buns, or noodles, for example) whose taste is improved by heating by the steam is placed. As a result, the foodstuff can be finished in good taste. At the same time, because the first foodstuff is heated by the microwaves, the heating time can be shortened.

Further, the second cooking container is provided close to the first cooking container. Then, the heat used to warm up the first foodstuff in the first cooking container is transferred to the second foodstuff in the second cooking container. Accordingly, the second foodstuff is heated by the indirectly transferred heat of the steam, not by the direct heat of the steam. Therefore, the foodstuff (grilled food, fried food, or sauces, for example) whose taste deteriorates when directly applied with the steam is accommodated as the second foodstuff in the second cooking container. Accordingly, by preventing the steam from directly entering the second cooking container, the taste of the second foodstuff in the second cooking container is prevented from being reduced.

At the same time with the heat transfer, the second foodstuff is heated by the microwaves in a similar manner to that of the heating of the first foodstuff. Therefore, the heating time can be shortened.

Further, the heating cooker provided with cooking container according to the present invention may include the second container lid covering the upper part of the second cooking container. Accordingly, the steam can be prevented from entering the second cooking container.

Further, in the heating cooker provided with cooking container according to the present invention, the bottom surface of the second cooking container may function as the first container lid. According to this configuration, the steam entering the first cooking container is directly applied to the bottom surface of the second cooking container. Accordingly, the heat of the steam is more easily transferred to the second foodstuff in the second cooking container. As a result, the heating time of the second foodstuff can be shortened.

Further, the heating cooker provided with cooking container according to the present invention may include a concave part and a convex part on a bottom part of the second cooking container. According to the present configuration, a clearance can be provided between the second foodstuffs in the second cooking container. Accordingly, the microwaves can be made to act on the second foodstuff from the clearance formed by the convex part. As a result, the second foodstuff can be heated more uniformly.

Further, the heating cooker provided with cooking container according to the present invention may include a steam vent hole on the convex part of the bottom part of the second cooking container. Accordingly, the heat from the steam passing the convex part is easily transferred to the second foodstuff in the second cooking container. As a result, the heating time of the second foodstuff can be shortened.

Further, the heating cooker provided with cooking container according to the present invention may have the second cooking container configured in a bag shape, and further include a steam release section, and the second cooking container is disposed on the first container lid with the steam release section being an upper side of the second cooking container.

According to this configuration, the heat can be transferred from the first container lid to the second cooking container, and the first foodstuff can be heated by the heat having warmed up the second foodstuff. At the same time, the second foodstuff is heated by the microwaves as well. Accordingly, the heating time of the second foodstuff can be shortened.

Further, the second foodstuff is heated in the sealed bag-shaped second cooking container. At this time, when a steam pressure in the bag-shaped second cooking container reaches a predetermined pressure, the steam can be safely released by being ejected the steam from the steam release section. Further, even when a part of the second foodstuff escapes outside at the time of releasing the steam, the escaped foodstuff is not applied to the foodstuff in the first cooking container. Accordingly, reduction in the taste of the first foodstuff can be prevented.

Further, the heating cooker provided with cooking container according to the present invention may further include a container cover that encloses the second cooking container. Further, the heating cooker provided with cooking container according to the present invention may have a side wall on an outer periphery side of an opening of the concave part of the second cooking container.

Accordingly, a whole of the second cooking container can be effectively heated. As a result, uneven heating of the second foodstuff can be more re duce d.

Further, the heating cooker provided with cooking container according to the present invention may have a steam through hole provided in the first container lid. Accordingly, the steam introduced into the first cooking container can be effectively introduced into the second cooking container.

Further, the heating cooker provided with cooking container may have further a steam vent hole provided on the second container lid. Accordingly, in conjunction with the steam vent hole of the convex part of the second cooking container, the steam can be effectively discharged while the heat of the steam is being transferred to the wall surface of the second cooking container.

Further, in the heating cooker provided with cooking container according to the present invention, the first cooking container may be configured to accommodate the second cooking container, and a flange portion of the second cooking container functions as the first container lid. Accordingly, displacement does not easily occur. Further, the second foodstuff in the second cooking container can be efficiently heated by the steam introduced into the first cooking container.

INDUSTRIAL APPLICABILITY

The heating cooker provided with cooking container according to the present invention has a simple configuration, can improve the taste of each foodstuff, and can quickly cook by heating. Therefore, the heating cooker can be applied to a processing device for a heating process and the like in a food manufacturing plant.

REFERENCE MARKS IN THE DRAWINGS 1 body
2a, 2b microwave generation device
3a, 3b magnetron
4a, 4b wave guide
5 cooking chamber
6 steam generation device
7 steam discharge portion
8, 36 container mounting part (cooking-container mounting part)
9 steam inlet
10, 37 steam outlet
11, 38 first container (first cooking container)
11a, 38a bottom wall
11b, 38b, 38c side wall
12, 45, 59 first container lid
13, 24, 27 first foodstuff
14 communication hole
15a, 15b opening hole
16 holding portion
17a, 17b, 17c, 25, 28 space
18 foot portion
19, 39, 40a flange portion
20 steam reservoir space
21, 31, 40, 47, 53, 61 second container (second cooking container)
21a, 33a bottom surface
22, 35, 43, 50, 57 second container lid
23, 26, 29, 34 second foodstuff
30 external container
32, 41, 48, 54 convex part
33, 42, 49, 55 concave part
41a, 48a upper surface
43a, 44, 50a, 51, 57a, 58 steam vent hole
46 steam through hole
52 container cover
56 side wall
60 ledge
62 steam release section

The invention claimed is:

1. A heating cooker provided with cooking container, comprising:
a cooking chamber provided inside a body of the heating cooker and having a door openably provided in a front opening part;
a microwave generation device that transfer microwaves to the cooking chamber via a wave guide;
a steam generation device installed in the body;
a cooking-container mounting part provided in the cooking chamber;
a steam discharge portion having a first end installed in the steam generation device and having a second end inserted into the cooking-container mounting part;
a first cooking container accommodated in the cooking-container mounting part and accommodating a first foodstuff, and a first container lid covering an upper part of the first cooking container;
a second cooking container provided close to the first cooking container, partitioned from the first cooking container and accommodating a second foodstuff; and
an opening hole provided in the first cooking container and communicating between a space in the first cooking container and a space in the cooking-container mounting part,
wherein the microwave generation device radiates the first cooking container and the second cooking container with the microwaves,
the steam generation device introduces steam into the first cooking container via the opening hole, and
the steam directly heats the first foodstuff accommodated in the first cooking container, and indirectly heats the second foodstuff accommodated in the second cooking container.

2. The heating cooker provided with cooking container according to claim 1, further comprising a second container lid covering an upper part of the second cooking container.

3. The heating cooker provided with cooking container according to claim 1, wherein a bottom surface of the second cooking container functions as the first container lid.

4. The heating cooker provided with cooking container according to claim 1, wherein the second cooking container comprises a concave part and a convex part on a bottom part.

5. The heating cooker provided with cooking container according to claim 4, wherein a steam vent hole is provided on the convex part of the second cooking container.

6. The heating cooker provided with cooking container according to claim 1, wherein
the second cooking container is configured in a bag shape and further comprises a steam release section, and
the second cooking container is disposed on the first container lid with the steam release section being an upper side of the second cooking container.

7. The heating cooker provided with cooking container according to claim 1, further comprising a container cover that encloses the second cooking container.

8. The heating cooker provided with cooking container according to claim 1, wherein the second cooking container has a side wall on an outer periphery side of an opening of the concave part.

9. The heating cooker provided with cooking container according to claim 1, wherein the first container lid has a steam through hole.

10. The heating cooker provided with cooking container according to claim 2, wherein the second container lid further has a steam vent hole.

11. The heating cooker provided with cooking container according to claim 1, wherein the first cooking container is configured to accommodate the second cooking container, and a flange portion of the second cooking container functions as the first container lid.

* * * * *